UNITED STATES PATENT OFFICE.

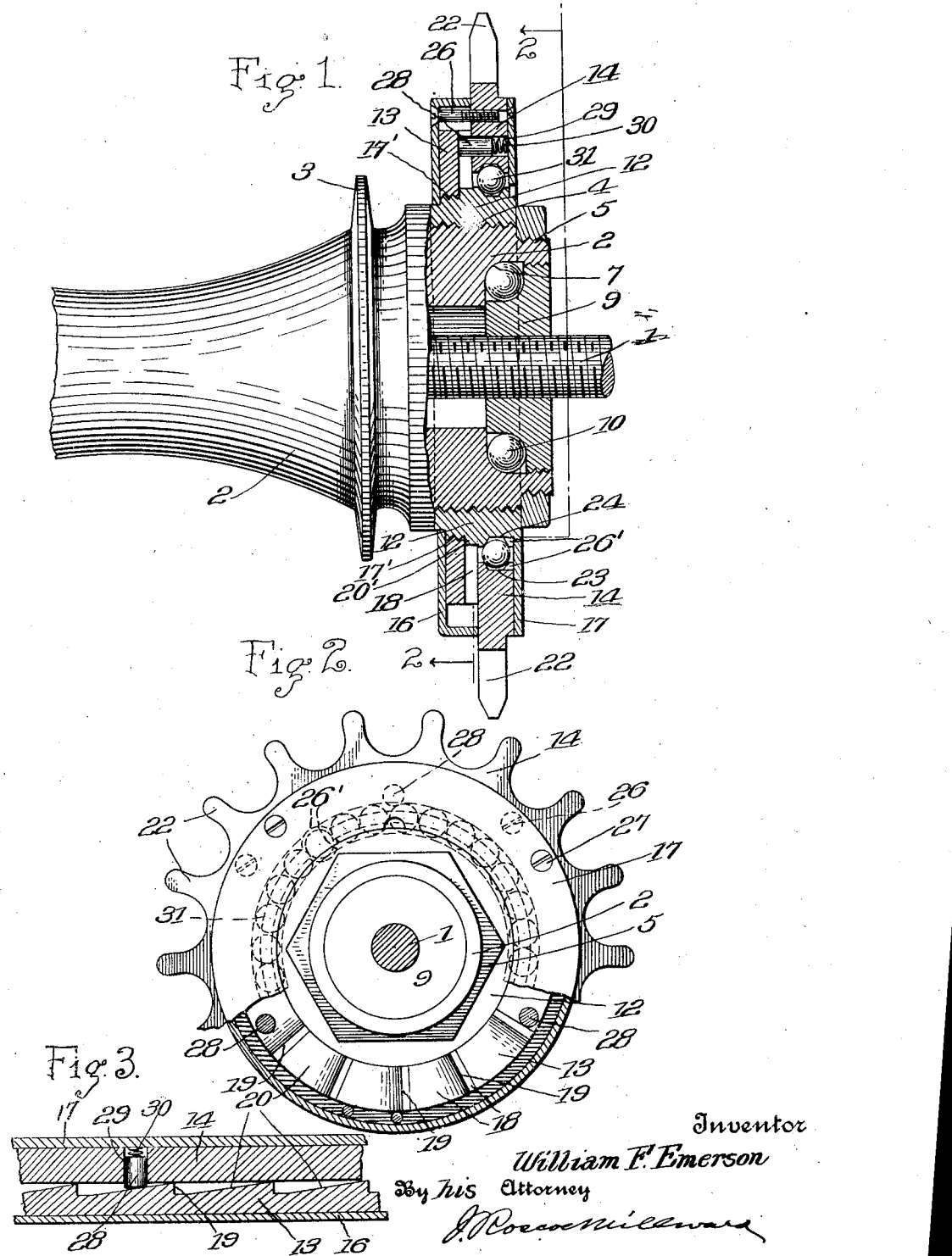

WILLIAM FREDERICK EMERSON, OF BUFFALO, NEW YORK, ASSIGNOR TO GENERAL MOTORS CORPORATION, OF DETROIT, MICHIGAN, A CORPORATION OF DELAWARE.

DRIVING AND COASTING MECHANISM FOR BICYCLES.

1,361,757.　　　　Specification of Letters Patent.　　Patented Dec. 7, 1920.

Application filed March 3, 1919. Serial No. 280,240.

*To all whom it may concern:*

Be it known that I, WILLIAM F. EMERSON, a citizen of the United States, residing at Buffalo, in the county of Erie and State of New York, have invented new and useful Improvements in Driving and Coasting Mechanism for Bicycles, of which the following is a specification.

This invention relates to a so called "free wheel" driving device for bicycles and the like and consists of a driving clutch and coasting mechanism of an improved construction and arrangement which is designed particularly to be of few and substantial parts, to be positive and quickly responsive in its operation and to possess advantages over the mechanisms heretofore used particularly with respect to the strength and durability of the parts and economy of manufacture. My improved device is especially adapted for use with the ordinary and standard rear hub construction of bicycles and for this purpose it is desirably so formed and proportioned that the same may be attached to the standard thread of the rear wheel hub in place of the usual rigid sprocket threaded thereon. The device of my invention is further constructed so that when so used the working parts will be fully protected from dust and dirt entering therein and interfering with the proper functioning of the parts.

A particularly important feature of the present invention consists in the employment of a driving plate or ratchet member having laterally directed cam or ratchet teeth and a suitably journaled driving or sprocket member associated therewith and having fitted therein coupling pins adapted to co-act with the aforesaid ratchet teeth to couple the parts for propelling the wheel when the sprocket is rotated in one direction and to permit free rotation of the wheel with relation to the driving sprocket in the reverse direction for coasting. The foregoing improved arrangement of the parts is particularly desirable from a manufacturing standpoint for the same permits of the ratchet teeth being economically formed under pressure, by a suitable die, which may be then hardened. The co-acting pins may be few in number and may therefore with economy be of hardened steel to present a very durable wearing surface and being few in number further offers negligible resistance to the free rotation of the wheel during the coasting action.

The described and other features and advantages which contribute to my improved free wheel device are shown in the accompanying drawing wherein the reference characters of this description are applied to the corresponding parts of the several views. Therein Figure 1 is a vertical, longitudinal, sectional view illustrating a desirable embodiment of my invention shown in position upon the rear hub of a bicycle. Fig. 2 is a view in side elevation thereof with portions broken away to show the interior parts and Fig. 3 is a diagrammatic view showing a development of the cam or ratchet teeth and correlated parts in a horizontal plane.

In the approved embodiment of my invention here illustrated 1 indicates the usual stationary axle for the wheel upon which is journaled the wheel hub 2 having the usual spoke flanges 3 and at one side thereof the threaded shoulder portions 4 and 5 adapted respectively to have threaded thereon the usual driving sprocket and securing nut therefor; the threads for this purpose being usually of a standard diameter and pitch. The hub as illustrated is provided with an internal cone or ball race 7 adapted to co-act with a bearing cone 9 threaded on the axle 1 to form therebetween a ball race for the usual bearing balls 10 upon which the hub is thus journaled to rotate.

The improved free wheel driving device of my invention is designed to be fitted and secured upon the described standardized threaded shoulder 4 of the wheel hub and when so positioned will operate to permit of the wheel being propelled upon the forward rotation of the sprocket and will also permit of the wheel hub advancing with relation to the sprocket member with a free wheel action to permit of coasting when desired.

My improved driving and coasting device as aforesaid is composed of few and simple parts and is shown consisting of the securing and bearing sleeve 12 having attached thereto a ratchet plate member 13 and having journaled thereon a driving and sprocket member 14 the latter having attached thereto protective cover plates 16 and 17. As illustrated the ratchet member 13 is threaded upon the sleeve 12 by means of a suitable thread 17' and is thereby affixed to and rotatable with the wheel hub 2. The incline of the thread 17 is such that the ratchet member is threaded thereon in the direction of rotation and in its innermost position abuts against a shoulder 20 on the sleeve 12. From this it results that the driving forces will tend to tighten the ratchet member in position on the sleeve.

Upon its inwardly directed side surface the ratchet member 13 is formed with an annular series of laterally projecting ratchet teeth or cams 18 having abrupt shoulders or surfaces 19 directed rearwardly with relation to forward rotation of the hub and with inclined surfaces 20 directed forwardly with relation to the advance or forward rotation of the wheel hub. The aforesaid ratchet teeth 18 are desirably formed integral with the ratchet member 13 by means of a suitable die acting under pressure thereon.

The sprocket or driving member 14 is desirably formed as shown with the circumferential sprocket teeth 22 for the usual driving chain and at its inner periphery is formed with an annular bearing groove 23 coacting with an external bearing groove 24 of the sleeve 14 to form a ball race for the bearing balls 31 upon which the driving member 14 is journaled. As shown the ball bearings are admitted within the ball race through a suitable aperture 26' formed in the respective members 12 and 14 at one point in their circumference. As best illustrated in Fig. 1 inner and outer protective cover plates 16 and 17 are carried by the sprocket member 14 the same being attached thereto by means of the screws 26 and 27. These protective plates 16 and 17 extend inwardly into close proximity to the sleeve 12 and overlie outwardly directed shoulders of said sleeve 4 thereby to provide an angular line of separation between said sleeve and said cover plates thereby effectively to prevent dust and foreign matter entering within the space inclosed within the cover plates as shown.

In accordance with my invention the coupling means employed to couple the sprocket member 14 to the hub during forward rotation consists of the aforesaid ratchet member 13 and shiftable coupling elements carried by the sprocket member and operative to co-act with the ratchet teeth. In my improved construction the coupling elements employed consist of the steel pins 28 fitted within suitable apertures 29 in the sprocket member 14 and shiftable laterally within the apertures and with relation to the ratchet teeth 18. Suitable compression springs 30 are interposed between the outer ends of the coupling pins 28 and the cover plates 17 and operative normally to shift said pins 28 toward and into engagement with the ratchet teeth. The coupling pins 28 may desirably be formed of hardened steel such as round drill rod and the pins will therefore be very durable in their wearing qualities which permits of employing a minimum number of the coupling pins, for instances as here shown three only are employed.

In consequence of this arrangement, as will be readily appreciated, during the coasting action there will be a minimum resistance to the rotation of the wheel owing to the reduced number of yielding pins. The relative arrangement of the pins and ratchet teeth is such that when one pin is in position of engagement with the abrupt shoulder of a ratchet tooth the other of said pins will assume an intermediate position of engagement with the inclines of a ratchet tooth and desirably these pins are in progressively advanced positions relative to the ratchet teeth whereby in all positions of the sprocket or driving member with reference to the ratchet or driven member 13 a coupling pin will, practically speaking, be in proper position to engage the abrupt shoulder 19 of one of the cams thereby eliminating back-lash or lost motion in coupling the two parts to rotate together.

In operation upon the forward or advance rotation of the sprocket or driving member 14 with relation to the hub 2 of the wheel to be propelled the coupling pins 28 which, as described, are shifted laterally into engagement with the ratchet teeth 18, will by their engagement with the rearwardly directed shoulders 19 effect the coupling of the sprocket and the ratchet member 13 to rotate together in the forward direction and in consequence will propel the wheel hub. Upon the cessation of the propelling motion of the driving member 14 and upon the advance rotation of the hub 2 and ratchet member 13 with relation thereto, as occurs when coasting, the inclines 20 of the ratchet teeth will act upon the coupling pins 28, shifting the said pins laterally and against the influence of the springs 30. Thus the advance rotation of the hub will be freely permitted by the yielding action of the coupling pins and this coasting will be particularly free in its action by reason of the employment of the anti-friction balls 31 interposed between the sleeve and sprocket members 12 and 14.

The foregoing and approved embodiment of my invention is particularly of value in the fact that it employs few and simple parts which are moreover adaptable to economy of manufacture. The mechanism so formed is furthermore quickly responsive and positive in its action, and is so formed as to afford full protection to the operating parts and interior surfaces against the admission of dust and foreign particles.

While I have shown a desirable and preferred embodiment of my invention it will be understood that the same is subject to various modifications without departing from the scope of the invention as defined in the appended claims and it is therefore intended that all matter contained therein shall be interpreted as illustrative and not in a limiting sense.

I claim:

1. In a device of the character described, the combination with the hub and the axle, of a bearing sleeve having securing engagement with the hub to be rotatable therewith, a bearing groove formed in said bearing sleeve, a driving sprocket member formed on its inner periphery with a co-acting groove to form a race-way for ball bearings, bearing balls fitted within said race-way upon which the driving sprocket is journaled, coupling elements carried by said driving sprocket to be laterally shiftable therein, a coupling member secured to the bearing sleeve to be rotatable therewith, said coupling member being formed with laterally directed ratchet teeth positioned to be engaged by the coupling members to effect coupling engagement between the sprocket and the coupling member upon the advance rotation of the sprocket with relation thereto and to permit of free coasting upon the reversed relative movement of said parts, compression springs associated with the coupling elements normally to force said elements into operative engagement with the ratchet teeth, said bearing sleeve and driving sprocket members being formed with lateral apertures adapted when in registration to permit passage of the bearing balls therethrough, and protective inclosing plates carried by the sprocket member and adapted to overlie and inclose the coupling member, the coupling elements and the ball-race and a portion of the bearing sleeve and in close proximity to the latter thereby to protect the operating parts from dust entering thereinto and adapted to overlie the registering openings of the bearing sleeve and sprocket members substantially as described.

2. In a driving and coasting mechanism, the combination with the hub and the axle, of a driving sprocket suitably journaled, coupling elements fitted to apertures therein and arranged to be shiftable laterally within the apertures, a coupling member rotatably secured to the hub and provided with an annular series of laterally directed ratchet teeth arranged to be engaged by the coupling elements, said ratchet teeth being formed by abrupt shoulder portions adapted to be engaged by the coupling elements upon the advance rotation of the driving member with relation to the hub whereby the latter is coupled to rotate therewith for driving and said ratchet teeth being provided with inclined surfaces adapted to act upon the coupling elements upon the advance rotation of the hub with reference to the driving member, protective inclosing plates carried by the driving sprocket and adapted protectively to inclose the coupling parts and compression springs interposed between the coupling elements and the protective inclosing means and operative normally to move said coupling elements into operative engagement with the ratchet teeth substantially as described.

In testimony whereof I have signed my name to this specification.

WILLIAM FREDERICK EMERSON.

Witnesses:
E. S. KNAPP,
E. G. VIERTEL.